US012719992B2

(12) United States Patent
Shah et al.

(10) Patent No.: US 12,719,992 B2
(45) Date of Patent: Aug. 25, 2026

(54) METHOD AND SYSTEM FOR ENSURING DUAL BAR CODE AUTHENTICATION OF DOCUMENTS

(71) Applicant: Tata Consultancy Services Limited, Mumbai (IN)

(72) Inventors: Viral Prakash Shah, Thane (IN); Rishi Setiya, Thane (IN); Naveen Vaishnav, Gandhinagar (IN); Manish Rawat, New Delhi (IN); Shivam Singh, Lucknow (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 206 days.

(21) Appl. No.: 18/817,635

(22) Filed: Aug. 28, 2024

(65) Prior Publication Data

US 2025/0106329 A1 Mar. 27, 2025

(30) Foreign Application Priority Data

Sep. 26, 2023 (IN) ............................ 202321064645

(51) Int. Cl.
*H04N 1/00* (2006.01)
*G06K 7/14* (2006.01)
*G06V 30/12* (2022.01)

(52) U.S. Cl.
CPC ....... *H04N 1/00334* (2013.01); *G06K 7/1417* (2013.01); *G06V 30/133* (2022.01)

(58) Field of Classification Search
CPC ....... G06F 16/93; G06F 21/64; G06K 7/1417; G06N 20/00; G06Q 10/06; H04N 1/00334; G06V 30/133; G06V 30/14
See application file for complete search history.

(56) References Cited

U.S. PATENT DOCUMENTS 8,282,002 B2 10/2012 Shams
9,594,993 B2 3/2017 Picard et al.
(Continued)

OTHER PUBLICATIONS

Mushfika Sharmin Rahman et al., "An Approach to Facilitate Business System by Multiple Barcode Detection using Faster RCNN," International Journal of Applied Information Systems, Dec. 2019, vol. 12; Issue: 26, Foundation of Computer Science, https://www.researchgate.net/publication/337934775_An_Approach_to_Facilitate_Business_System_by_Multiple_Barcode_Detection_using_Faster_RCNN.

(Continued)

*Primary Examiner* — Fred Guillermety
(74) *Attorney, Agent, or Firm* — FINNEGAN, HENDERSON, FARABOW, GARRETT & DUNNER LLP

(57) ABSTRACT

The embodiments of present disclosure herein address unresolved problems of a file path encryption, a manual quality check and a dual bar-code verification while scanning and transferring of the answer sheets to a server via a communication network. Embodiments herein provide a system and method for ensuring a dual bar code-based authentication of answer sheets. The system and method provide a multilevel security that is achieved by a programmatic scanning and validation. A metadata tagging, and manual quality check can be carried out by an operator. The system and method provide a file transfer over a Hypertext Transfer Protocol (HTTP) network and with the help of a blow-fish algorithm, media files path is stored in an encrypted manner. The system and method restrict any third-party entity to get access to the confidential data and ensure a single user authorization from scanning, monitoring to package creation and an operator management.

12 Claims, 2 Drawing Sheets

(56) References Cited

U.S. PATENT DOCUMENTS

| | | | | |
|---|---|---|---|---|
| 10,467,464 | B2 | 11/2019 | Chen et al. | |
| 2010/0157318 | A1* | 6/2010 | Ming | G07D 7/202<br>358/1.1 |

OTHER PUBLICATIONS

N. Harini et al., "2CAuth: A New Two Factor Authentication Scheme Using QR-Code," International Journal of Engineering and Technology (IJET), 2013, vol. 5; Issue: 2, https://citeseerx.ist.psu.edu/document?repid=rep1&type=pdf&doi=199a71f02c63-b4b84a00e9b73fd538d28ed92362.

Atiqul Islam Chowdhury et al. "A Study on Multiple Barcode Detection from an Image in Business System," International Journal of Computer Applications, Jan. 2019, vol. 181; Issue: 37, https://www.researchgate.net/publication/330667113_A_Study_on_Multiple_Barcode_Detection_from_an_Image_in_Business_System.

Akshata Kolekar et al. "Barcode Detection and Classification using SSD (Single Shot Multibox Detector) Deep Learning Algorithm," Proceedings of the 3rd International Conference on Advances in Science & Technology (ICAST) 2020, 2020, https://papers.ssrn.com/sol3/papers.cfm?abstract_id=3568499.

Noah Oluwatobi Akande et al. "Electronic Medical Information Encryption Using Modified Blowfish Algorithm," ICCSA 2019, 2019, Springer, https://eprints.lmu.edu.ng/3176/1/Electronic%20Medical%20Information%20Encryption%20Using%20Modified%20Blowfish%20Algorithm.pdf.

Kurniawan Nur Prasetyo et al. "An implementation of data encryption for Internet of Things using blowfish algorithm on FPGA," 2014 2nd International Conference on Information and Communication Technology (ICoICT), May 2014, https://www.researchgate.net/publication/272157650_An_implementation_of_data_encryption_for_Internet_of_Things_using_blowfish_algorithm_on_FPGA.

Mathias Slawik et al., "Securing Medical SAAS Solutions Using a Novel End-To-End Encryption Protocol," Twenty Second European Conference on Information Systems, 2014, Association for Information Systems AIS Electronic Library (AISeL), https://citeseerx.ist.psu.edu/document?repid=rep1&type=pdf&doi=280b2894e8d48ccd92b5d47496a7dfed839b4a17.

Alessandro Zamberletti et al., "Neural 1D Barcode Detection Using the Hough Transform Title of the item: IPSJ Transactions on Computer Vision and Applications," Jan. 2015, vol. 7, Information Processing Society of Japan, https://www.researchgate.net/publication/276313555_Neural_1D_Barcode_Detection_Using_the_Hough_Transform.

Hyeon Cho et al., "2D Barcode Detection using Images for Drone-assisted Inventory Management," Sensors (Basel), 2018, https://www.researchgate.net/publication/327192592_2D_Barcode_Detection_using_Images_for_Drone-assisted_Inventory_Management.

* cited by examiner

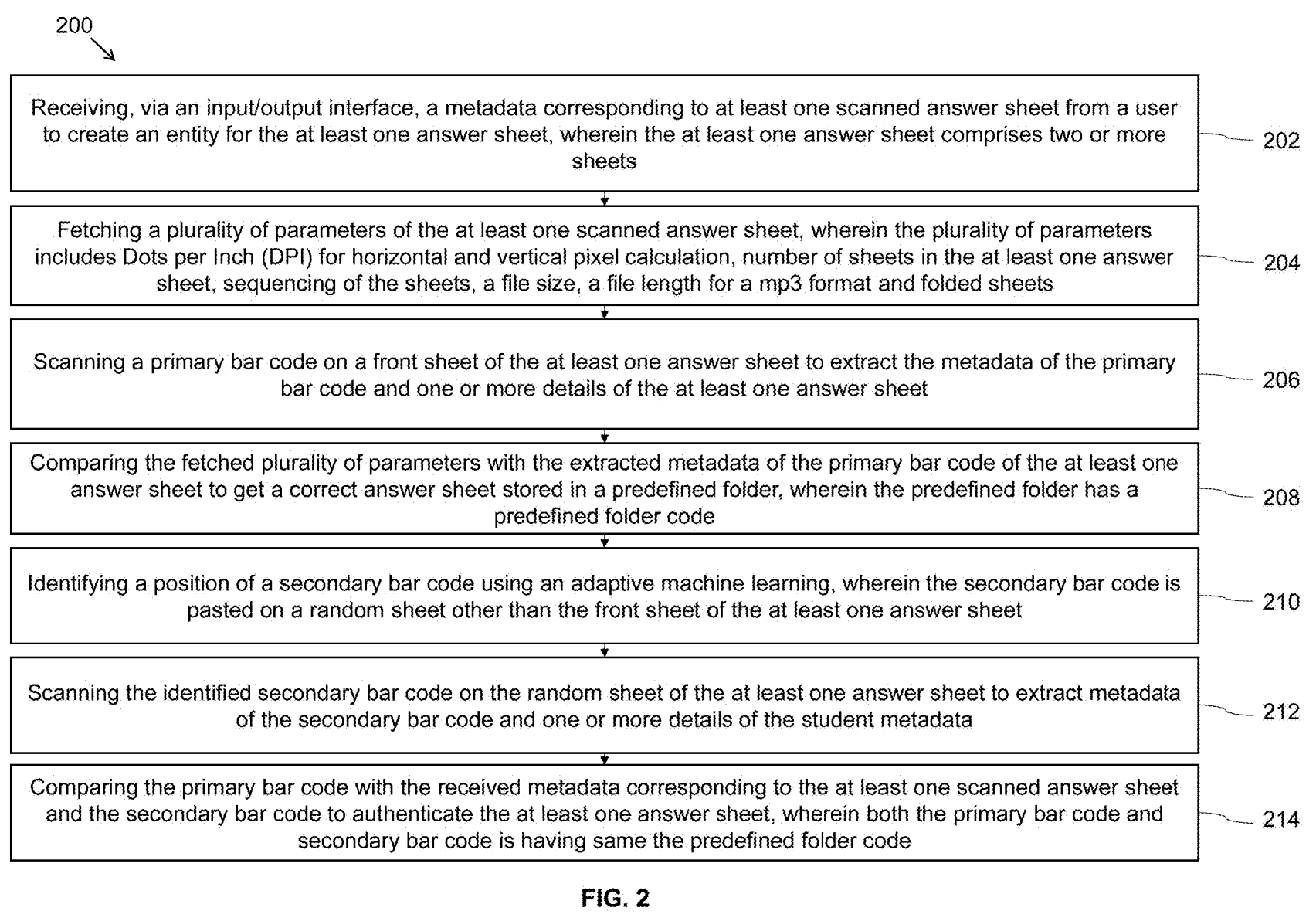

200

Receiving, via an input/output interface, a metadata corresponding to at least one scanned answer sheet from a user to create an entity for the at least one answer sheet, wherein the at least one answer sheet comprises two or more sheets — 202

Fetching a plurality of parameters of the at least one scanned answer sheet, wherein the plurality of parameters includes Dots per Inch (DPI) for horizontal and vertical pixel calculation, number of sheets in the at least one answer sheet, sequencing of the sheets, a file size, a file length for a mp3 format and folded sheets — 204

Scanning a primary bar code on a front sheet of the at least one answer sheet to extract the metadata of the primary bar code and one or more details of the at least one answer sheet — 206

Comparing the fetched plurality of parameters with the extracted metadata of the primary bar code of the at least one answer sheet to get a correct answer sheet stored in a predefined folder, wherein the predefined folder has a predefined folder code — 208

Identifying a position of a secondary bar code using an adaptive machine learning, wherein the secondary bar code is pasted on a random sheet other than the front sheet of the at least one answer sheet — 210

Scanning the identified secondary bar code on the random sheet of the at least one answer sheet to extract metadata of the secondary bar code and one or more details of the student metadata — 212

Comparing the primary bar code with the received metadata corresponding to the at least one scanned answer sheet and the secondary bar code to authenticate the at least one answer sheet, wherein both the primary bar code and secondary bar code is having same the predefined folder code — 214

FIG. 2

METHOD AND SYSTEM FOR ENSURING DUAL BAR CODE AUTHENTICATION OF DOCUMENTS

PRIORITY CLAIM

This U.S. patent application claims priority under 35 U.S.C. § 119 to Indian Application No. 202321064645, filed on Sep. 26, 2023. The entire content of the abovementioned application is incorporated herein by reference.

TECHNICAL FIELD

The disclosure herein generally relates to the field of scanning management, and more particularly, to a method and system for ensuring a dual bar code authentication of documents.

BACKGROUND

A scanning management is an integral part of a digital marking process which enables an end user to carry out the scanning and uploading of answer sheets for further evaluation and result processing purpose. The scanning management is a one stop solution for performing activities related to marking of answer book, file sharing, quality check, and bar/QR code authentication.

Checking quality of the scanned answer sheets is crucial for the evaluation along with security assurance. Currently there is no provision for quality checks to avoid rejection of answer sheets. None of the existing technologies ensure both auto and Manual quality check. None of the existing solutions provide File path encryption. Currently data syncing across systems to perform activity remotely cannot be achieved.

Existing systems are capable of ensuring scanning and transfer of the answer sheet to the server via a communication network, however, lack the features such as file path encryption, manual quality check and dual bar-code verification. Further, the existing systems ensure computer-based assessment and digital marking but without file sharing and authentication of the document and whole process is designed for OMR based answer-sheets.

Furthermore, the existing systems and processes include a relational database and enterprise integrated application software program associated with multiple large-scale test and assessment projects but there is no provision of bar-code validation and quality check. Further, the system for document authentication by generating barcode with authentication information and comparing later through remote server where authentication information is stored but lack in dual barcode validation, so if barcode is swapped there is no way for authentication.

SUMMARY

Embodiments of the present disclosure present technological improvements as solutions to one or more of the above-mentioned technical problems recognized by the inventors in conventional systems. For example, in one embodiment, a method for ensuring dual bar code authentication of documents is provided. The processor-implemented method includes receiving, via an input/output interface, a metadata corresponding to each of at least one scanned answer sheet from a user to create an entity for each of the at least one scanned answer sheet, wherein each of the at least one scanned answer sheet includes two or more sheets.

Further, the processor-implemented method comprises fetching, via one or more hardware processors, a plurality of parameters of the at least one scanned answer sheet, scanning, via the one or more hardware processors, a primary bar code on a front sheet of each of the one or more answer sheets to extract the metadata of the primary bar code and one or more details of the one or more answer sheets, and comparing, via the one or more hardware processors, the fetched plurality of parameters with the extracted metadata of the primary bar code of each of the one or more answer sheets to get a right answer sheet stored in a right folder.

Furthermore, the processor-implemented method comprises identifying, via the one or more hardware processors, a position of a secondary bar code using an adaptive machine learning, wherein the secondary bar code is pasted on a random sheet other than the front sheet of each of the one or more answer sheets, scanning, via the one or more hardware processors, the identified secondary bar code on the random sheet of the answer sheet to extract metadata of the secondary bar code and one or more details of the student metadata and comparing, via the one or more hardware processors, the primary bar code with a predefined folder corresponding to each of the at least one scanned answer sheet and secondary bar code to authenticate sheets of the answer sheet that are not swapped in each of the one or more answer sheets, wherein both the primary bar code and secondary bar code is associated with the answer sheet.

In another aspect, a system for ensuring dual bar code authentication of documents is provided. The system comprises a memory storing a plurality of instructions and one or more Input/Output (I/O) interfaces to receive a metadata corresponding to each of at least one scanned answer sheet from a user to create an entity for each of the at least one scanned answer sheet, wherein each of the at least one scanned answer sheet includes two or more sheets. Further, the system comprises one or more hardware processors coupled to the memory via the one or more I/O interfaces, wherein the one or more hardware processors are configured by the instructions to execute a plurality of modules of the system. The one or more hardware processors are configured to fetch a plurality of parameters of the at least one scanned answer sheet, scan a primary bar code on a front sheet of each of the one or more answer sheets to extract the metadata of the primary bar code and one or more details of the one or more answer sheets and compare the fetched plurality of parameters with the extracted metadata of the primary bar code of each of the one or more answer sheets to get a right answer sheet stored in a right folder.

Furthermore, one or more hardware processors are configured to identify a position of a secondary bar code using an adaptive machine learning, wherein the secondary bar code is pasted on a random sheet other than the front sheet of each of the one or more answer sheets, scan the identified secondary bar code on the random sheet of the answer sheet to extract metadata of the secondary bar code and one or more details of the student metadata and compare the primary bar code with the received metadata corresponding to each of the at least one scanned answer sheet and secondary bar code to authenticate that sheets of the answer sheet are not swapped in each of the one or more answer sheets, wherein both the primary bar code and secondary bar code is associated with the answer sheet.

In yet another aspect, there are provided one or more non-transitory machine-readable information storage mediums comprising one or more instructions, which when executed by one or more hardware processors causes a method for ensuring dual bar code authentication of documents is provided. The processor-implemented method includes receiving, via an input/output interface, a metadata corresponding to each of at least one scanned answer sheet from a user to create an entity for each of the at least one scanned answer sheet, wherein each of the at least one scanned answer sheet includes two or more sheets.

Further, the processor-implemented method comprises fetching a plurality of parameters of the at least one scanned answer sheet, scanning a primary bar code on a front sheet of each of the one or more answer sheets to extract the metadata of the primary bar code and one or more details of the one or more answer sheets, and comparing the fetched plurality of parameters with the extracted metadata of the primary bar code of each of the one or more answer sheets to get a right answer sheet stored in a right folder.

Furthermore, the processor-implemented method comprises identifying a position of a secondary bar code using an adaptive machine learning, wherein the secondary bar code is pasted on a random sheet other than the front sheet of each of the one or more answer sheets, scanning the identified secondary bar code on the random sheet of the answer sheet to extract metadata of the secondary bar code and one or more details of the student metadata and comparing the primary bar code with the received metadata corresponding to each of the at least one scanned answer sheet and secondary bar code to authenticate that sheets of the answer sheet are not swapped in each of the one or more answer sheets, wherein both the primary bar code and secondary bar code is associated with the answer sheet.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 is an exemplary flow diagram illustrating a processor-implemented method for ensuring dual bar code authentication of documents, according to some embodiments of the present disclosure.

DETAILED DESCRIPTION

Figure 1:
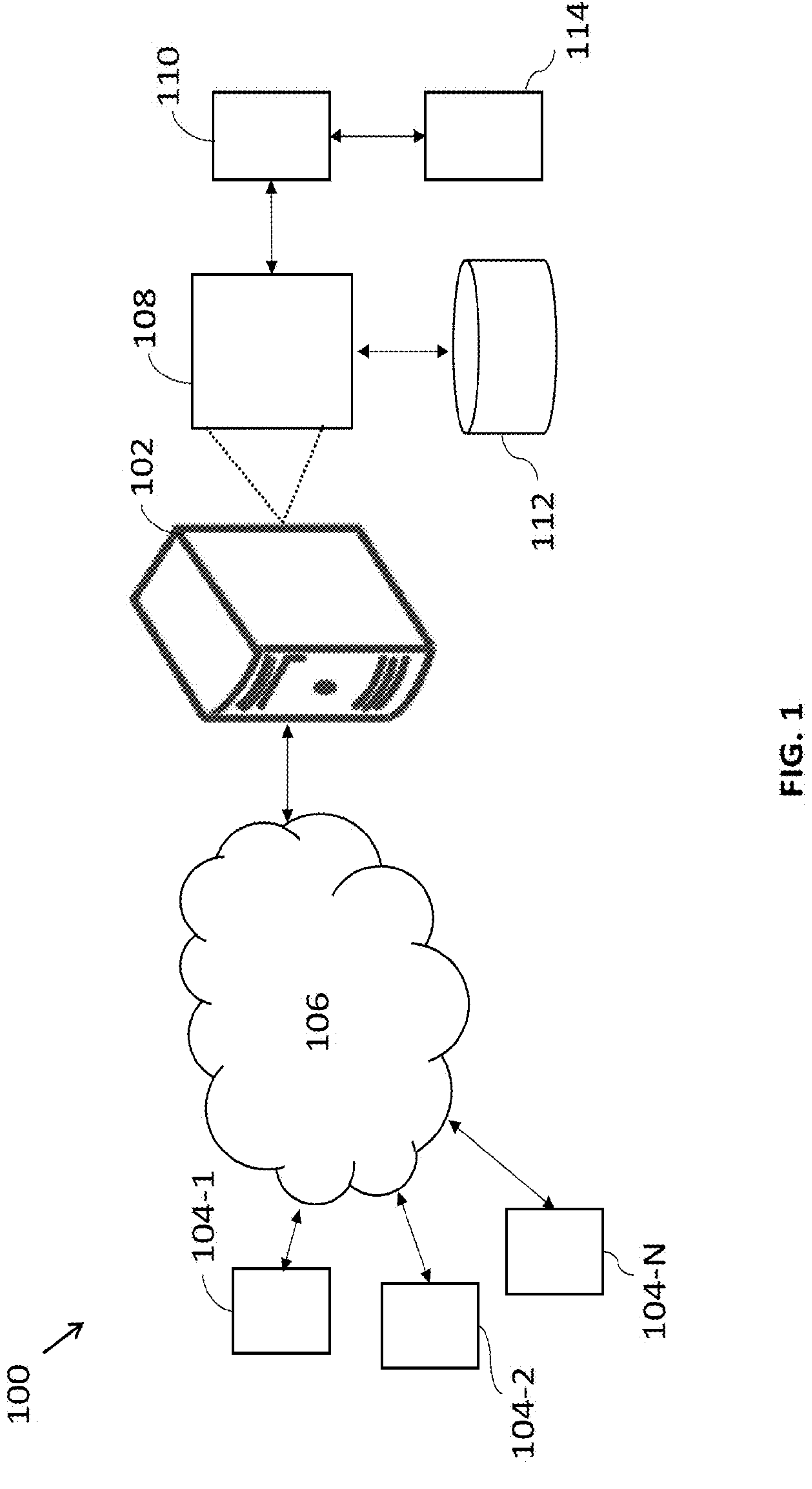
FIG. 1 illustrates an exemplary system for ensuring dual bar code authentication of documents, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

A Scanning Management (SM) is an integral part of digital marking process which enables the end user to carry out the scanning and uploading of Answer sheets for further evaluation and result processing purposes. The SM is a one stop solution for performing activities related to marking of answer book-file sharing, quality check, bar/Quick Response (QR) code authentication. In the SM, already scanned answer sheets are shared in secure manner by a file path encryption. An auto scan and bar code verification process enhance the overall experience in terms of both reliability and ease of use. With both auto and manual quality checks of the answer sheet, the overall rejections from markers end have been reduced to an extent (in terms of quality of media files). Local shared directory content path is encrypted and can now stream over a Hypertext Transfer Protocol (HTTP) network via multiple utility in a secure manner. With the help of a knowledge engineering, the scanning management can achieve auto and manual quality check, a bar-code verification, and a path encryption. Quality driven checks ensure the smaller number of rejections by evaluators/markers.

Existing techniques of scanning management ensure the scanning and transfer of the answer sheet to the server via a communication network but lacks the features such as file path encryption, manual quality check and dual bar-code verification. An imaging system for processing educational assessments is available in literature, however the system is built for the OMR based answer-sheets. The said system and process include a relational database and enterprise integrated application software program associated with multiple large-scale test and assessment projects but there is no provision of bar-code validation and quality check.

Another existing technique for automatic quality assessment of documents is based on predefined criteria but lack manual quality check and auto quality check parameters are different. Some other existing technique for document authentication generates barcode with authentication information and compares later through remote server where authentication information is stored but lack in dual barcode validation, so if barcode is swapped there is no way for authentication. Further, the existing techniques for scanning and generating image of educational assessments, scanned images are passed through applications to derive data from the images, the existing technique also identifies if the image is properly scanned but there is no provision to derive the predefined quality check parameters. A secure file sharing system and method, files are accessible if credentials are known but lack file path encryption.

Most of the prior arts focus the scanning of the OMR based answer-sheet but lack the features for hand-written answer-sheets. Some of the prior arts show the bar-code validation feature but none of them have the dual bar-code validation. Some of the prior arts show that the modification can be done of the answer sheets and as a security feature a time stamp will be visible, but present disclosure restricts the modification/editing of the answer sheets as sharing occurs over the HTTP server and file is encrypted, can only be read. Further, the disclosure herein provides integration of all these features such as secondary bar-code validation for authentication, file path encryption for secure data retrieval from database by TCM user and scanning check/quality check user and manual quality check which reduces the rejection of the answer sheets to minimum. Prior arts focus on validation through barcode but if the barcodes are swapped, then authenticate failed, to overcome this constraint the present disclosure has introduced a secondary bar code validation.

To overcome the challenges of the conventional approaches, embodiments herein provide a system and method for ensuring a dual bar code-based authentication of answer sheets. The present disclosure provides a multilevel security that is achieved by a programmatic scanning and validation. A metadata tagging, and manual quality check can be carried out by an operator. The system and method provide a file transfer over a Hypertext Transfer Protocol (HTTP) network and with the help of a blow-fish algorithm, media files path is stored in an encrypted manner. The system and method restrict any third-party entity to get access to the confidential data and ensure a single user authorization from scanning, monitoring to package creation and an operator management.

Referring now to the drawings, and more particularly to FIG. 1 through FIG. 2, where similar reference characters denote corresponding features consistently throughout the figures, there are shown preferred embodiments, and these embodiments are described in the context of the following exemplary system and/or method.

FIG. 1 illustrates a network diagram of an exemplary system for ensuring a dual bar code-based authentication of one or more answer sheets, in accordance with an example embodiment. Although the present disclosure is explained considering that the system 100 is implemented on a server, it may be understood that the system 100 may comprise one or more computing devices 102, such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface 104. Examples of the I/O interface 104 may include, but are not limited to, a user interface, a portable computer, a personal digital assistant, a handheld device, a smartphone, a tablet computer, a workstation, and the like. The I/O interface 104 is communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 supports various connectivity options such as BLUETOOTH®, USB, ZigBee, and other cellular services. The network environment enables connection of various components of the system 100 using any communication link including Internet, WAN, MAN, and so on. In an exemplary embodiment, the system 100 is implemented to operate as a stand-alone device. The system 100 is connected with an integrated module (scanning management central instance) via the internet for metadata configuration and further marking process.

In another embodiment, the system 100 may be implemented to work as a loosely coupled device to a smart computing environment. Further, the system 100 comprises at least one memory 110 with a plurality of instructions, one or more databases 112, and one or more hardware processors 108 which are communicatively coupled with the at least one memory to execute a plurality of modules 114 therein. The plurality of modules 114, for example, includes a metadata configuration module 116, auto quality check module 118, the machine learning module 120, and an authentication module 122. The components and functionalities of the system 100 are described further in detail.

The I/O interface 104 is responsible for file sharing through the HTTP server, metadata sharing LAN/WAN (local network 106), to read a barcode on an image or more image. The I/O interface 104 takes frames (A1, A2, A3, A4 . . . . An) as input to locate the barcode. The I/O interface 104 shares its response for barcode, along with matched frame (if frame is not from shared frame (A1, A2, A3, A4 . . . . An) then the I/O interface 104 finds the barcode and frame (by single frame identification mechanism) and share with the plurality of modules 114 for further process. Post all authentication the I/O interface 104 also responsible for file upload to data center.

FIG. 2 is a flow diagram illustrating a processor-implemented method 200 for ensuring a dual bar code based authentication of one or more answer sheets implemented by the system 100 of FIG. 1. Functions of the components of the system 100 are now explained through steps of flow diagram in FIG. 2, according to some embodiments of the present disclosure. A digital marking process has several segments, whereas a scanning management (SM) plays a vital role in scanning and uploading one or more answer sheets for further evaluation and result processing. It would be appreciated if the quality checking of answer sheets before sending them to the evaluator minimizes the rejection rate of answer sheets. The authentication of answer sheets got more importance to avoid swapping of answer sheets and securely sharing of answer sheet using file path encryption of answer sheets. If SM performs all these activities before sharing answer sheets for marking, then it can reduce the rejection rate and enhances the reliability and ease of use.

Initially, at step 202 of the processor-implemented method 200, the one or more hardware processors 108 are configured by the programmed instructions to receive, via an input/output interface, a metadata corresponding to each of at least one scanned answer sheet from a user to create an entity for each of the at least one scanned answer sheet, wherein each of the at least one scanned answer sheet includes two or more sheets.

In one implementation, the metadata configuration module 116 of the system 100 includes metadata like medium, subject, date, set, file size and SPOC details to create bag is fetched through the digital marking-assessment data center (DM-ADC), API calls corresponding to the particular answer sheets. The metadata configuration module also stores the preconfigured event metadata. To initiate a file sharing process, bags need to be created from bag management dashboard. Hereinafter, bag and entity are being used interchangeably. Bags can be created directly or through excel templates. User needs to assign some metadata for the corresponding answer sheets like Medium, Subject, Set, File Size and Single Point of Contact (SPOC) details. After bag (entity) creation this data is validated and send to Scanning Management Central Instance (SMCI) for processing, bags are created through the DM-ADC and answer sheets are tagged to the particular bags through electronic-forms (E-forms) and then bag is closed (so that no new data can be added). To accomplish this tagging, a metadata utility is used. It stores data in a local database (DB) from where other modules can access it.

At the next step 204 of the processor-implemented method 200, the one or more hardware processors 108 are configured by the programmed instructions to fetch a plurality of parameters of the at least one scanned answer sheet. The plurality of parameters includes Dots per Inch (DPI) for horizontal and vertical pixel calculation, number of sheets in an answer sheet, sheet sequencing, file size, file length for mp3, file length for mp4 and folded sheets.

Further, the fetched plurality of parameters is taken as an input along with an event meta data for quality check. In the auto quality check module 118 of the system 100, a set of predefined rules are responsible for the plurality of parameters check and verification. The event meta data for quality check are compared against the preconfigured value. The quality check status is generated and shared on the user screen along with predefined folder code.

At the next step 206 of the processor-implemented method 200, the one or more hardware processors 108 are configured by the programmed instructions to scan a primary bar code on a front sheet of each of the one or more answer sheets to extract the metadata of the primary bar code and one or more details of the one or more answer sheets.

A bar code or Quick-Response code (QR-code) is read on image through a business logic. This data is used to train an adaptive mechanism model to a point where it is able to predict the most probable area for bar/QR code occurrence for the next image. It is to be noted that the adaptive learning collects and analyzes data in a sequential order, not all at once. This enables the adaptive machine learning models to monitor and learn from the changes in both input and output values. it allows the adaptive machine learning model to adapt its data collection, grouping, and analysis methods based on new information.

In one example, a Machine Learning (ML) model is trained for 70000 images. The ML model identifies each of the 70000 images into six frames like A1, A2, A3, A4, A5, and A6 according to most probable area for the bar code occurrences in a sequence of A3-A5-A2-A6-A1-A4. For the first 6000 images, A3 is the most probable area for bar/QR code occurrence. After 8000 images A1 becomes the most probable area, after that for 10000 images A6 become most probable area, for next 12000 images A2 become most probable are followed by A5 for next 16000 images and at last A3 become the most probable are for 18000 images. It is to be noted that the ML model changes the most probable area dynamically based on recent and overall data. Further, the score for each frame is calculated based on:

$$\text{Frame Score}=aS+bR+cQ+dP+eO \quad (1)$$

wherein, a, b, c, d, e is the co-efficient for each frame (window) which change dynamically based on the frame occurrence data. S, R, Q, P and O are calculated as a probability of last 100, 1000, 10000 and so on of the given images. Based on this, a score is calculated for each frame. The frame with the highest score is marked as most probable window/frame. New frames can also be added in the calculation based on frame occurrence data, when co-efficient exceeds a certain value.

In order to make an adaptive mechanism, a machine learning module 120 is employed which is based on some predefined rules and parameters to identify windows with highest probability of barcode occurrence. Such that time for reading is reduced and accuracy is increased. To train the machine learning module 120, a pre-defined co-ordinates/frames of the barcodes are received, width and height of the answer sheet is computed, each sheet of the answer sheet is scanned to identify the bar/QR code. The authentication module 122 takes input of frame from the machine learning module 120 and share its inputs of frame (A1, A2, A3, A4, A5 and A6) to the I/O interface 104. The I/O interface 104 reads the barcode and share its response which include identified barcode along with frame (this frame can be existing frame or newly identified frame) to the authentication module 122 for barcode authentication and the authentication module 122 will further communicate 120 for frame response. The I/O interface 104 takes input from the authentication module 122 for frame (A1, A2, A3, A4, A5 and A6) and its order (A3-A5-A2-A6-A1-A4). The I/O interface 104 reads the barcode on shared frame based on the ordering and confirms identified barcode and frame to the authentication module 122.

In another implementation, if the barcode is not found on the shared frames, then the at least one answer sheet is divided into four quadrants and each quadrant one after the other is scanned to find the barcode. Again, if the barcode is not found, then a small window on the image is selected and the whole sheet from top to bottom and left to right is scanned to find the barcode. Once again, if the bar code is not found, then window size is reduced to 500 px size to precisely check the barcode and scanning again on the sheet to find the barcode. The frame of the identified bar code is recorded and shared to the I/O interface 104 as an input.

At the next step 208 of the processor-implemented method 200, the one or more hardware processors 108 are configured by the programmed instructions to compare the fetched plurality of parameters with the extracted metadata of the primary bar code of each of the one or more answer sheets to get a right answer sheet stored in a right folder. The primary barcode and the predefined folder are stored in a local database and cross-checked with the barcode present on the answer sheet. This is to verify that softcopy is associated with the same hardcopy of answer sheets. If the bar/QR-codes of the one or more answer sheets are not validated with the metadata of the one or more answer sheets, then error will be generated and will not be shared for file upload. If it is validated, then it will be shared for uploading the file.

At the next step 210 of the processor-implemented method 200, the one or more hardware processors 108 are configured by the programmed instructions to identify a position of a secondary bar code using an adaptive machine learning. The secondary bar code is pasted on a random sheet other than the front sheet of each of the one or more answer sheets. The secondary bar code is also shared along with the metadata. The secondary bar code is validated with the primary bar-code. The secondary barcode is a combination of predefined folder code and metadata of one or more one or more answer sheets.

At the next step 212 of the processor-implemented method 200, the one or more hardware processors 108 are configured by the programmed instructions to scan the identified secondary bar code on the random sheet of the answer sheet to extract metadata of the secondary bar code and one or more details of the student metadata.

Finally, at the last step 214 of the processor-implemented method 200, the one or more hardware processors 108 are configured by the programmed instructions to compare the primary bar code with the received metadata corresponding to each of the at least one scanned answer sheet and secondary bar code to authenticate each of the one or more answer sheets, wherein both the primary bar code and secondary bar code is associated with the answer sheet.

The primary barcode and folder name (containing answer sheets) have the same predefined folder code, the secondary barcode provides an additional level of authentication, if all three are valid then soft copy is authentic. If the answer sheets of the students are swapped from inside the folder or front sheets of the answer sheets are swapped, error will be triggered failed, and file could not be uploaded. If the barcode is valid, it will be uploaded successfully. The barcode validation status is shared in the scanning management and the file is uploaded successfully to a data center.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problems of a file path encryption, a manual quality check and a dual bar-code verification while scanning and transferring of the answer sheets to a server via a communication network. Embodiments herein provide a system and method for ensuring a dual bar code-based authentication of answer sheets. The system and method provide a multilevel security that is achieved by a programmatic scanning and validation. A metadata tagging, and manual quality check can be carried out by an operator. The system and method provide a file transfer over a Hypertext Transfer Protocol (HTTP) network and with the help of a blow-fish algorithm, media files path is stored in an encrypted manner. The system and method restrict any third-party entity to get access to the confidential data and ensure a single user authorization from scanning, monitoring to package creation and an operator management.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising:

receiving, via an input/output interface, a metadata corresponding to at least one scanned answer sheet from a user to create an entity for the at least one answer sheet, wherein the at least one answer sheet comprises two or more sheets;

fetching, via one or more hardware processors, a plurality of parameters of the at least one scanned answer sheet, wherein the plurality of parameters includes Dots per Inch (DPI) for horizontal and vertical pixel calculation, number of sheets in the at least one answer sheet, sequencing of the sheets, a file size, a file length for a mp3 format and folded sheets;

scanning, via the one or more hardware processors, a primary bar code on a front sheet of the at least one answer sheet to extract the metadata of the primary bar code and one or more details of the at least one answer sheet;

comparing, via the one or more hardware processors, the fetched plurality of parameters with the extracted metadata of the primary bar code of the at least one answer sheet to get a correct answer sheet stored in a predefined folder, wherein the predefined folder has a predefined folder code;

identifying, via the one or more hardware processors, a position of a secondary bar code using an adaptive machine learning, wherein the secondary bar code is pasted on a random sheet other than the front sheet of the at least one answer sheet;

scanning, via the one or more hardware processors, the identified secondary bar code on the random sheet of the at least one answer sheet to extract metadata of the secondary bar code and one or more details of the student metadata; and comparing, via the one or more hardware processors, the primary bar code with the received metadata corresponding to the at least one scanned answer sheet and the secondary bar code to authenticate the at least one answer sheet, wherein both the primary bar code and secondary bar code is having same the predefined folder code.

2. The processor-implemented method of claim 1, further comprising:

generating, via the one or more hardware processors, a digital replica of the authenticated at least one answer sheet;

assigning, via the one or more hardware processors, the generated digital replica for a manual checking; and encrypting, via the one or more hardware processors, a local Hypertext Transfer Protocol (HTTP) file path with a Blow-Fish algorithm to upload the generated digital replica in the encrypted path.

3. The processor-implemented method of claim 1, wherein the at least one answer sheet is tagged with the created entity through an electronic-form.

4. The processor-implemented method of claim 1, wherein a quality check operator has a read-only option for the at least one answer sheet for the manual checking.

5. A system comprising:

a memory storing instructions;

one or more Input/Output (I/O) interfaces; and one or more hardware processors coupled to the memory via the one or more I/O interfaces, wherein the one or more hardware processors are configured by the instructions to:

receive a metadata corresponding to at least one scanned answer sheet from a user to create an entity for the at least one answer sheet, wherein the at least one answer sheet comprises two or more sheets;

fetch a plurality of parameters of the at least one scanned answer sheet, wherein the plurality of parameters includes Dots per Inch (DPI) for horizontal and vertical pixel calculation, number of sheets in the at least one answer sheet, sequencing of the sheets, a file size, a file length for a mp3 format and folded sheets;

scan a primary bar code on a front sheet of the at least one answer sheet to extract the metadata of the primary bar code and one or more details of the at least one answer sheet;

compare the fetched plurality of parameters with the extracted metadata of the primary bar code of the at least one answer sheet to get a correct answer sheet stored in a predefined folder, wherein the predefined folder has a predefined folder code;

identify a position of a secondary bar code using an adaptive machine learning, wherein the secondary bar code is pasted on a random sheet other than the front sheet of the at least one answer sheet;

scan the identified secondary bar code on the random sheet of the at least one answer sheet to extract metadata of the secondary bar code and one or more details of the student metadata; and compare the primary bar code with the received metadata corresponding to the at least one scanned answer sheet and the secondary bar code to authenticate the at least one answer sheet, wherein both the primary bar code and secondary bar code is having same the predefined folder code.

6. The system of claim 5, comprising:

generating, via the one or more hardware processors, a digital replica of the authenticated at least one answer sheet;

assigning, via the one or more hardware processors, the generated digital replica for a manual checking; and encrypting, via the one or more hardware processors, a local Hypertext Transfer Protocol (HTTP) file path with a Blow-Fish algorithm to upload the generated digital replica in the encrypted path.

7. The system of claim 5, wherein the at least one answer sheet is tagged with the created entity through an electronic-Form.

8. The system of claim 5, wherein a quality check operator has a read-only option for the at least one answer sheet for the manual checking.

9. One or more non-transitory machine-readable information storage mediums comprising one or more instructions which when executed by one or more hardware processors cause:

receiving, via an input/output interface, a metadata corresponding to at least one scanned answer sheet from a user to create an entity for the at least one answer sheet, wherein the at least one answer sheet comprises two or more sheets;

fetching a plurality of parameters of the at least one scanned answer sheet, wherein the plurality of parameters includes Dots per Inch (DPI) for horizontal and vertical pixel calculation, number of sheets in the at least one answer sheet, sequencing of the sheets, a file size, a file length for a mp3 format and folded sheets;

scanning a primary bar code on a front sheet of the at least one answer sheet to extract the metadata of the primary bar code and one or more details of the at least one answer sheet;

comparing the fetched plurality of parameters with the extracted metadata of the primary bar code of the at least one answer sheet to get a correct answer sheet stored in a predefined folder, wherein the predefined folder has a predefined folder code;

identifying a position of a secondary bar code using an adaptive machine learning, wherein the secondary bar code is pasted on a random sheet other than the front sheet of the at least one answer sheet;

scanning the identified secondary bar code on the random sheet of the at least one answer sheet to extract metadata of the secondary bar code and one or more details of the student metadata; and comparing the primary bar code with the received metadata corresponding to the at least one scanned answer sheet and the secondary bar code to authenticate the at least one answer sheet, wherein both the primary bar code and secondary bar code is having same the predefined folder code.

10. The one or more non-transitory machine-readable information storage mediums of claim 9, further comprising:

generating a digital replica of the authenticated at least one answer sheet;

assigning the generated digital replica for a manual checking; and encrypting a local Hypertext Transfer Protocol (HTTP) file path with a Blow-Fish algorithm to upload the generated digital replica in the encrypted path.

11. The one or more non-transitory machine-readable information storage mediums of claim 9, wherein the at least one answer sheet is tagged with the created entity through an electronic form.

12. The one or more non-transitory machine-readable information storage mediums of claim 9, wherein a quality check operator has a read-only option for the at least one answer sheet for the manual checking.

* * * * *